(12) United States Patent
Bar-on et al.

(10) Patent No.: US 7,685,918 B2
(45) Date of Patent: Mar. 30, 2010

(54) ROTATING SUSPENSION LUG

(75) Inventors: Eyal Bar-on, Hagelilit (IL); Ehud Krisher, Haifa (IL)

(73) Assignee: Rafael Advanced Defence Systems Ltd, Haifa (IL)

( * ) Notice: Subject to any disclaimer, the term of this patent is extended or adjusted under 35 U.S.C. 154(b) by 0 days.

(21) Appl. No.: 12/173,460

(22) Filed: Jul. 15, 2008

(65) Prior Publication Data

US 2009/0107324 A1    Apr. 30, 2009

(30) Foreign Application Priority Data

Jul. 23, 2007    (IL) ...................................... 184789

(51) Int. Cl.
   *B64D 1/04*    (2006.01)
(52) U.S. Cl. ...................... 89/1.54; 102/382; 294/82.26
(58) Field of Classification Search .................. 89/1.51, 89/1.54, 1.819, 1.58; 102/382; 244/131, 244/137.4; 294/82.26
   See application file for complete search history.

(56) References Cited

U.S. PATENT DOCUMENTS

| | | | |
|---|---|---|---|
| 3,967,529 A | 7/1976 | Ingle et al. | |
| 4,170,923 A | 10/1979 | Kilmer | |
| 4,392,411 A * | 7/1983 | Minkler | ...................... 89/1.819 |
| 5,056,408 A | 10/1991 | Joner et al. | |
| 5,961,075 A | 10/1999 | Russell, III | |
| 6,212,987 B1 * | 4/2001 | Jakubowski et al. | ......... 89/1.54 |

* cited by examiner

*Primary Examiner*—Michael Carone
*Assistant Examiner*—Benjamin P Lee
(74) *Attorney, Agent, or Firm*—Merchant & Gould P.C.

(57) ABSTRACT

A suspension lug for releasably suspends loads under aircraft. The suspension lug has a lug eye and a threaded base and a rotation mechanism is inserted into the threaded portion. When the suspension lug is threaded into a compatible well in the load and the load is released from the aircraft, the rotation mechanism causes the suspension lug to rotate by ninety degrees from an initial orientation in which the face of the lug eye is pointed in the direction of flight to a final orientation in which the edge of the lug eye is pointed in the direction of flight. The rotation of the lug eye significantly reduces the drag on the load. Also described are methods of manufacturing and using the suspension lug of the invention.

8 Claims, 15 Drawing Sheets

ROTATING SUSPENSION LUG

FIELD OF THE INVENTION

The present invention relates to the field of aviation. Specifically the invention relates to systems for suspending loads on the underside of an aircraft, which can be released when the aircraft is in flight.

BACKGROUND OF THE INVENTION

Worldwide, the most commonly used system for attaching detachable loads to an aircraft makes use of a pair of suspension lugs attached to the load. On the underside of the aircraft is an assembly comprising hooks that fit through the lug eyes. When it is desired to release the load, the assembly on the aircraft is activated to slide the hooks out of the lug eyes allowing the load with the lugs attached to fall away from the aircraft.

FIG. 1 shows a typical load 10 with two suspension lugs 12 attached. In FIG. 2 is shown a standard suspension lug 12. Suspension lug 12 is made from a solid piece of metal and comprises a threaded base 14 to attach it to the load and a lug eye 16 into which the hook fits to secure the load to the aircraft. In most of the air forces in the Western world, the lugs are standard and, depending on the size of the load, conform to the specification Mil-A-8591, which governs all characteristics of the lug, such as physical dimensions, minimum load carrying ability, etc.

In normal use, the lugs are stored separately from the loads. Each load has two standard sized threaded wells located on its top side. The wells are spaced apart by a distance that is standard, and conforms to the specification Mil-A-8591 and are located relative to the center of gravity of the load, such that the load will separate from the aircraft properly when released. When the time comes to attach the load to the aircraft, the load and lugs are removed from storage and brought near to the aircraft. The ground crew screws the lugs into the threaded wells on the load. The lugs are screwed in by hand and are turned until the bottom of the lug eye is level with the surface of the load and the lug eyes are perpendicular to the direction of flight as shown in FIG. 1. The load is then raised under the aircraft and the hooks on the assembly of the aircraft are slipped through the lug eyes.

After releasing the load from the aircraft, the lugs remain attached to the load and make a significant contribution to the total aerodynamic drag on the load as it moves through the air. In modern combat situations it is of critical importance to the completion of the mission and, more importantly, to the safety of the aircraft and its crew to increase the stand-off distance for releasing payloads to the maximum. Therefore a great deal of attention has been given to reducing the drag on the load, thereby allowing it to be released further from the target.

Theoretical calculations, which have been verified by means of measurements combining wind tunnel tests, show that in the typical case of a freefalling payload of the type shown in FIG. 1 the two lugs of the standard type shown in FIG. 2 may contribute up to 16% of the parasitic drag on the load.

The most common technique used in the prior art to reduce the drag caused by the lugs that connect detachable loads to aircraft before release is to modify the load in such a way that the lugs are withdrawn beneath the surface of the load once it is released from the aircraft. Examples of arrangements of this type of varying degree of complexity are disclosed in the following patents U.S. Pat. Nos. 5,056,408, 5,961,075, 3,967,529, and 4,170,923.

Taking into account the vast quantity of loads, especially armament of various types, that are stored at any one time in various locations around the world, the comparable numbers of suspension lugs, and especially the desire and necessity of maintaining standardization so that loads can easily be attached to and released from various types of aircraft, it would be desirable to provide an easy method of reducing the drag caused by the suspension lugs, which would allow the continued use of these available stores and further would allow continued production using existing production lines and standards. Such a method should ideally require no changes to the aircraft or load and should involve minimal changes to the work routine of the ground crews that prepare the loads and attach them to the aircraft.

It is therefore a purpose of the invention to provide a modified suspension lug which will allow loads to be releasably connected to aircraft and will contribute significantly less than standard lugs to the drag on the load after it released.

It is another purpose of the invention to provide a modified suspension lug in which comprises a mechanism that is simple, reliable, and safe.

It is yet another purpose of the invention to provide a modified suspension lug which interfaces to the load and aircraft while complying with the requirements of the widely-accepted standard MIL-A-8591.

It is yet another purpose of the invention to provide a modified suspension lug which can be attached to or removed from the load easily using only standard equipment or tools.

Further purposes and advantages of this invention will appear as the description proceeds.

SUMMARY OF THE INVENTION

In a first aspect the invention is a suspension lug for releasably suspending loads under aircraft. The suspension lug comprises a lug eye and a threaded base and is characterized in that a rotation mechanism is inserted into the threaded portion. When the suspension lug is threaded into a compatible well in the load and the load is released from the aircraft, the rotation mechanism causes the suspension lug to rotate by ninety degrees from an initial orientation in which the face of the lug eye is pointed in the direction of flight to a final orientation in which the edge of the lug eye is pointed in the direction of flight. The rotation of the lug eye significantly reduces the drag on the load.

Embodiments of the rotation mechanism comprise a stopper, which comprises a locking mechanism; a bushing; a return spring; and a retaining screw.

In embodiments of the suspension lug of the invention, the locking mechanism is a separate brake attached to the stopper by a screw that can be turned from outside of the threaded base of the suspension lug when the suspension lug is threaded into a well in the load. Tightening the screw causes the brake to move radially outwards jamming it against the interior wall of the well thereby locking the stopper preventing it from rotating relative to the load. After the stopper is locked, the other components of the rotation mechanism allow the suspension lug to rotate relative to the load.

In embodiments of the suspension lug the threaded base of the suspension lug has been modified to allow the suspension lug to be rotated clockwise or counterclockwise within a maximum range of ninety degrees.

In another aspect the invention is a method of making a suspension lug according to the first aspect of the invention from a standard suspension lug. The method comprising:

a. removing a section of the bottom of the threaded base of the standard suspension lug to create a hollow space to accommodate the rotation mechanism; and
b. removing at least a part of the face on each side of the lug eye of the standard suspension lug to create a more slender side profile of the lug eye.

In another aspect the invention is method of using one or more suspension lugs according to the first aspect of the invention for reversibly suspending a load comprising one or more compatible wells appropriately located on its top side from the bottom of an aircraft. The method comprises the steps of:
a. bringing the load and the one or more suspension lugs from storage to a location close to the aircraft;
b. screwing the one or more suspension lugs into the one or more wells as far as possible by hand without the use of tools;
c. unscrewing each of the one or more suspension lugs a partial turn until the edge of the lug eye of each of the suspension lugs is pointed in the direction of flight;
d. inserting a tool through a channel bored through the threaded base of each of the suspension lugs and tightening the screw of the locking mechanism, thereby preventing rotation of the stopper of the rotation mechanism of the suspension lug relative to the load;
e. rotating, using a hand held tool, each of the suspension lugs ninety degrees clockwise so that the face of the lug eye of each of the suspension lugs is pointed in the direction of flight, thereby tensioning the spring of the rotation mechanism of each of the suspension lugs;
f. holding, using the hand held tool, each of the suspension lugs so that the face of the lug eye of each of the suspension lugs is pointed in the direction of flight while raising the load towards the underside of the aircraft and slipping a hook of the suspension apparatus of the aircraft through the lug eye of each of the suspension lugs, thereby suspending the load from the bottom of the aircraft; and
g. slipping the hooks out of the lug eye of each of the suspension lugs, thereby allowing the springs in the rotation mechanisms to return to their untensioned state and causing the suspension lugs to rotate until the edge of the lug eye of each of the suspension lugs is pointed in the direction of flight.

All the above and other characteristics and advantages of the invention will be further understood through the following illustrative and non-limitative description of preferred embodiments thereof with reference to the appended drawings.

DETAILED DESCRIPTION OF PREFERRED EMBODIMENTS

Figure 2:
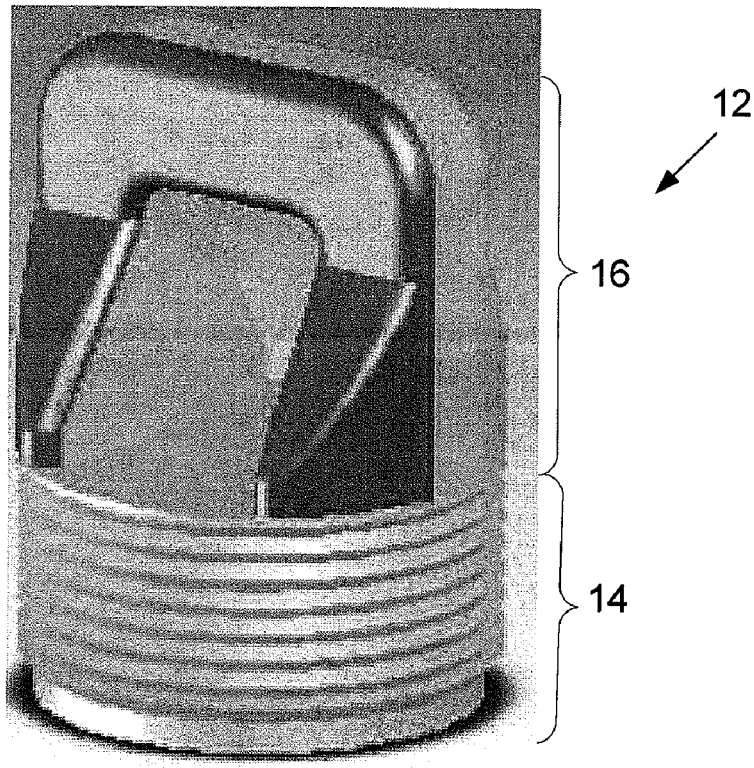
FIG. 2 shows a prior art suspension lug.
Figure 3:
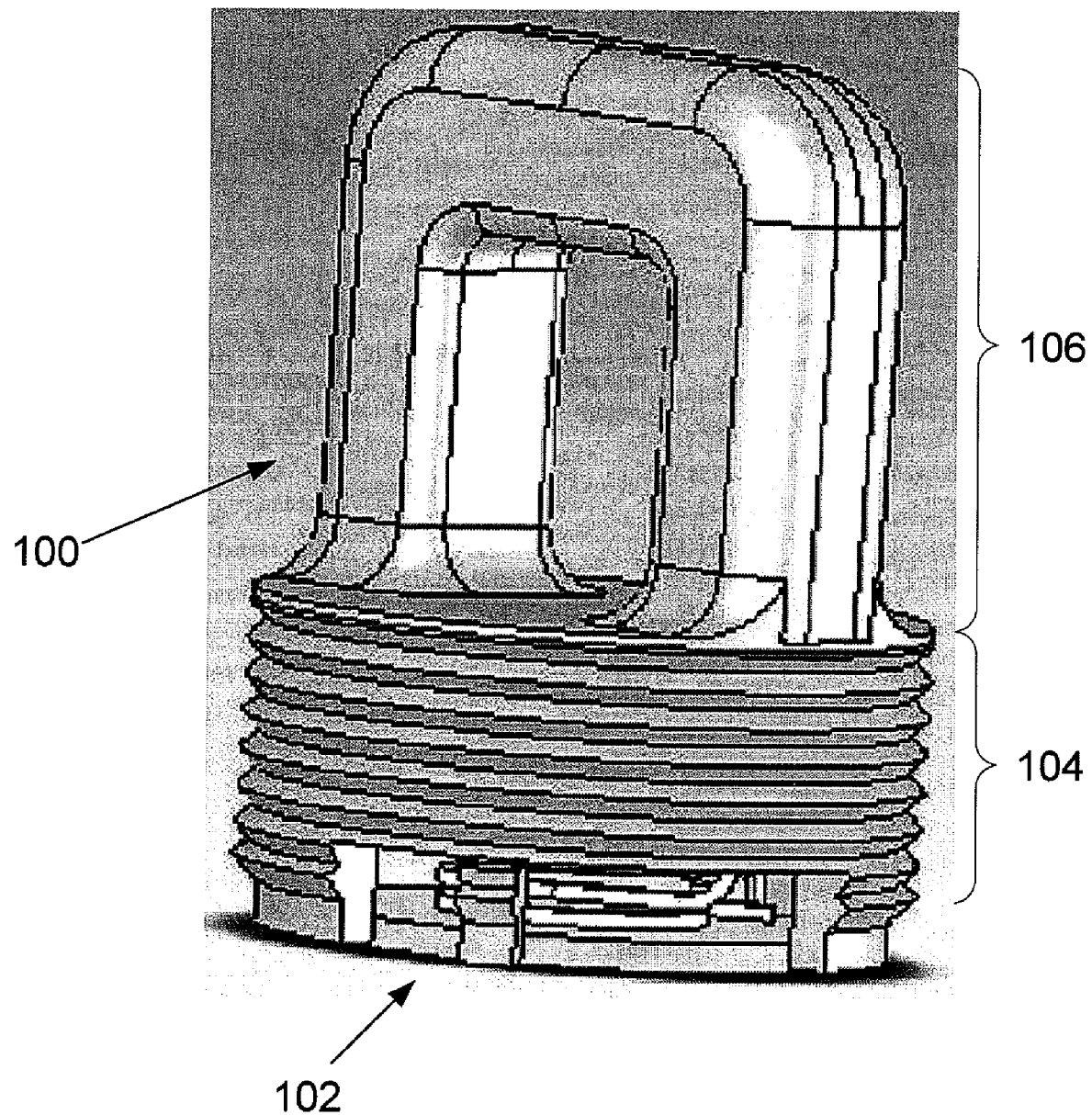
FIG. 3 shows the suspension lug of the invention.

FIG. 3 shows a suspension lug 100 according to the present invention. The present invention reduces the drag caused by the suspension lugs by modifying the standard lug shown in FIG. 2 in two ways. Firstly, the bottom of the threaded base 104 is hollowed out and a mechanism 102 is inserted in the hollowed out space that causes suspension lug 100 to rotate by ninety degrees when the hook is withdrawn from the lug eye 106, i.e. when the load is released from the aircraft.

Figure 4A:
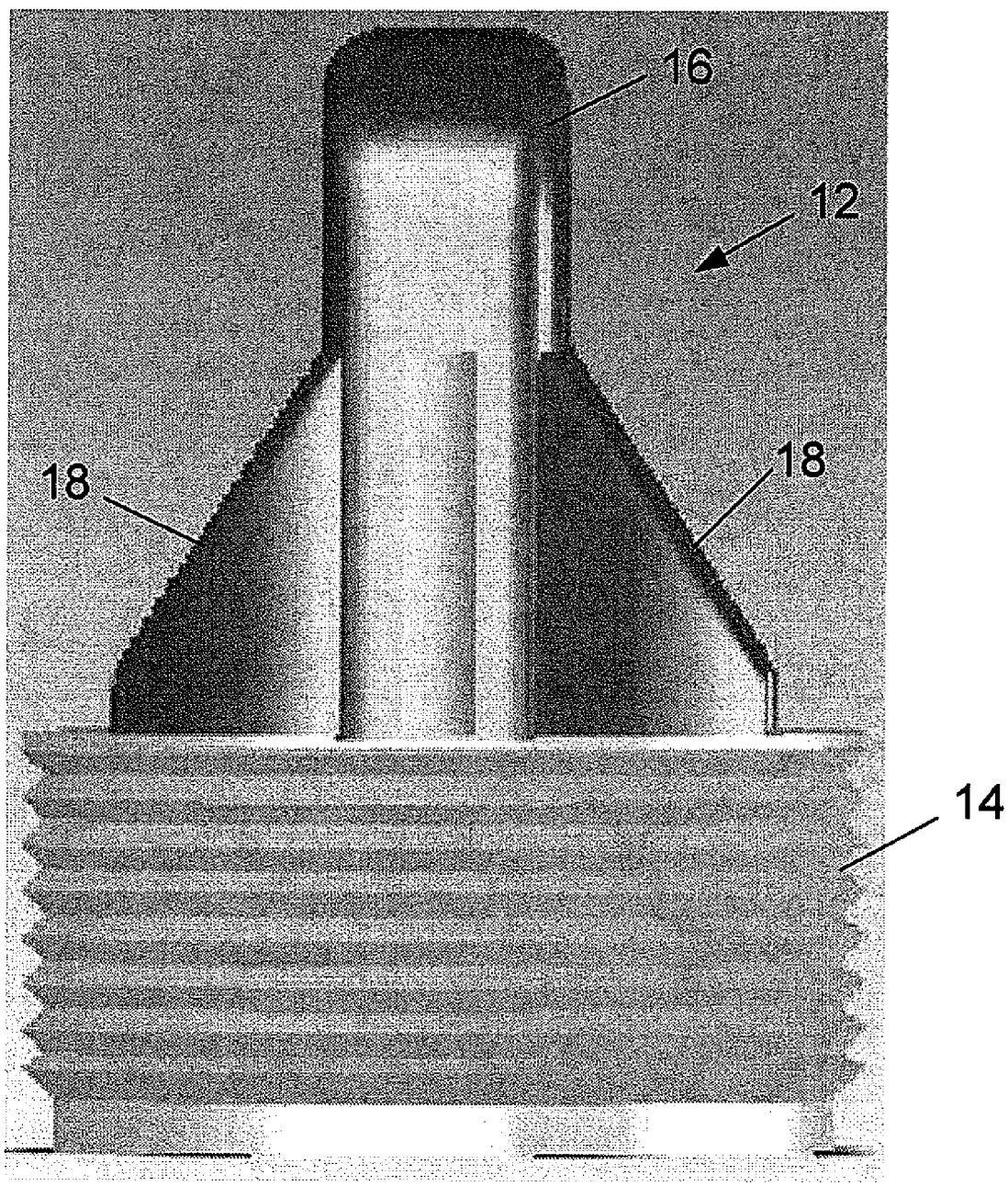
FIG. 4A is a side view of the prior art suspension lug shown in FIG. 2.
Figure 4B:
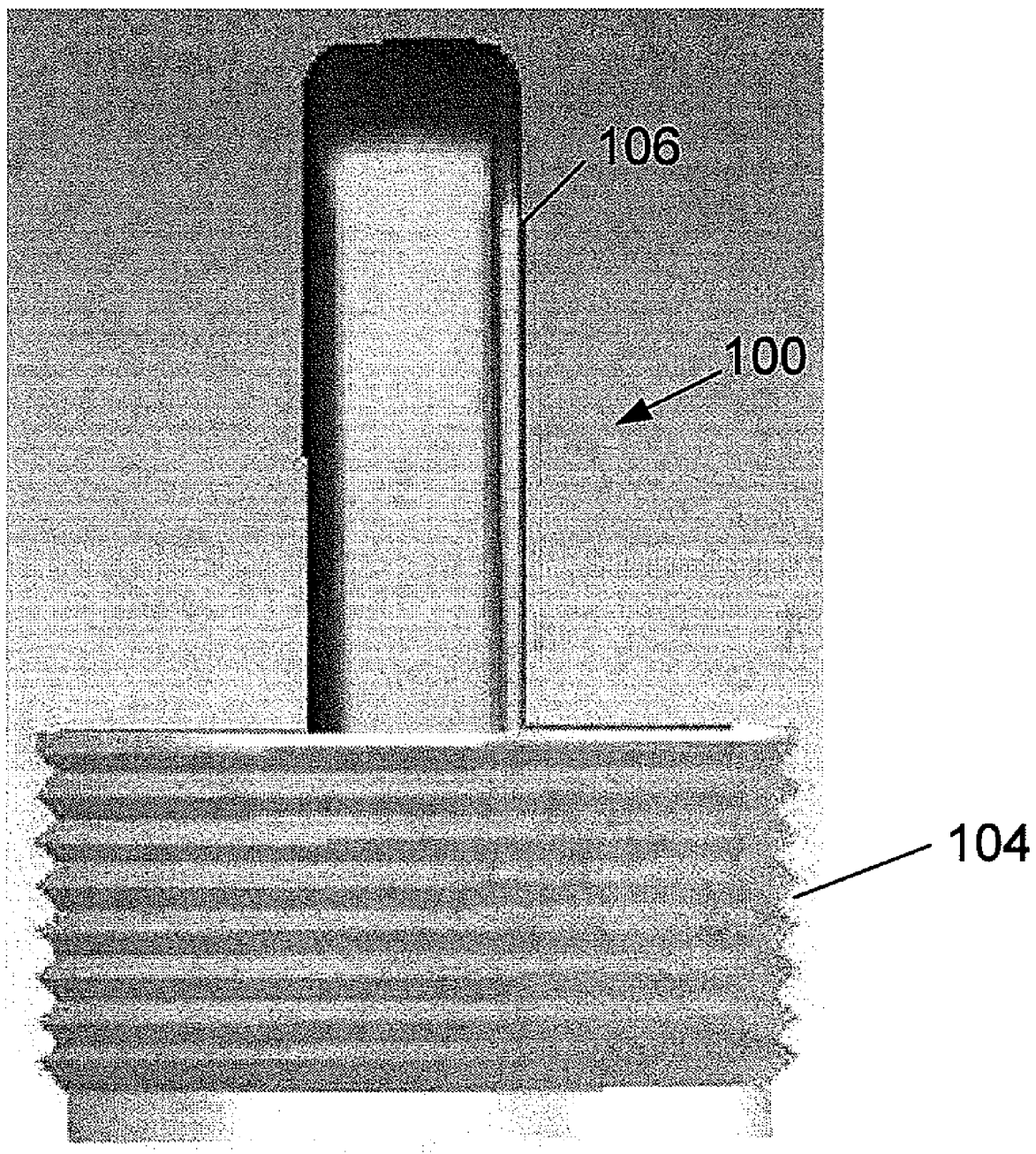
FIG. 4B is a side view of a prior art suspension lug whose lug eye has been modified according to the invention.

After the suspension lug has rotated by ninety degrees, the edge of the lug eye is facing the direction of flight. If a conventional suspension lug 12, such as that shown in FIG. 4A, were used in the invention the profile facing the direction of flight after the rotation would still be relatively large because of the sloped surfaces 18. Therefore, the second modification made to the standard lug is to reduce the profile of the lug eye 106 in the direction of flight as shown in FIG. 4B.

The present invention does not require that the aircraft or the load be modified in any way. The modifications made to the standard lug are such that the interfaces with the aircraft and the load are unchanged. Furthermore, because of over design of the standard suspension lugs, even after the modifications are carried out the suspension lug of the invention fulfills the requirements of MIL-A-8591 and functions exactly as does the standard lug that it replaces.

Figure 5:
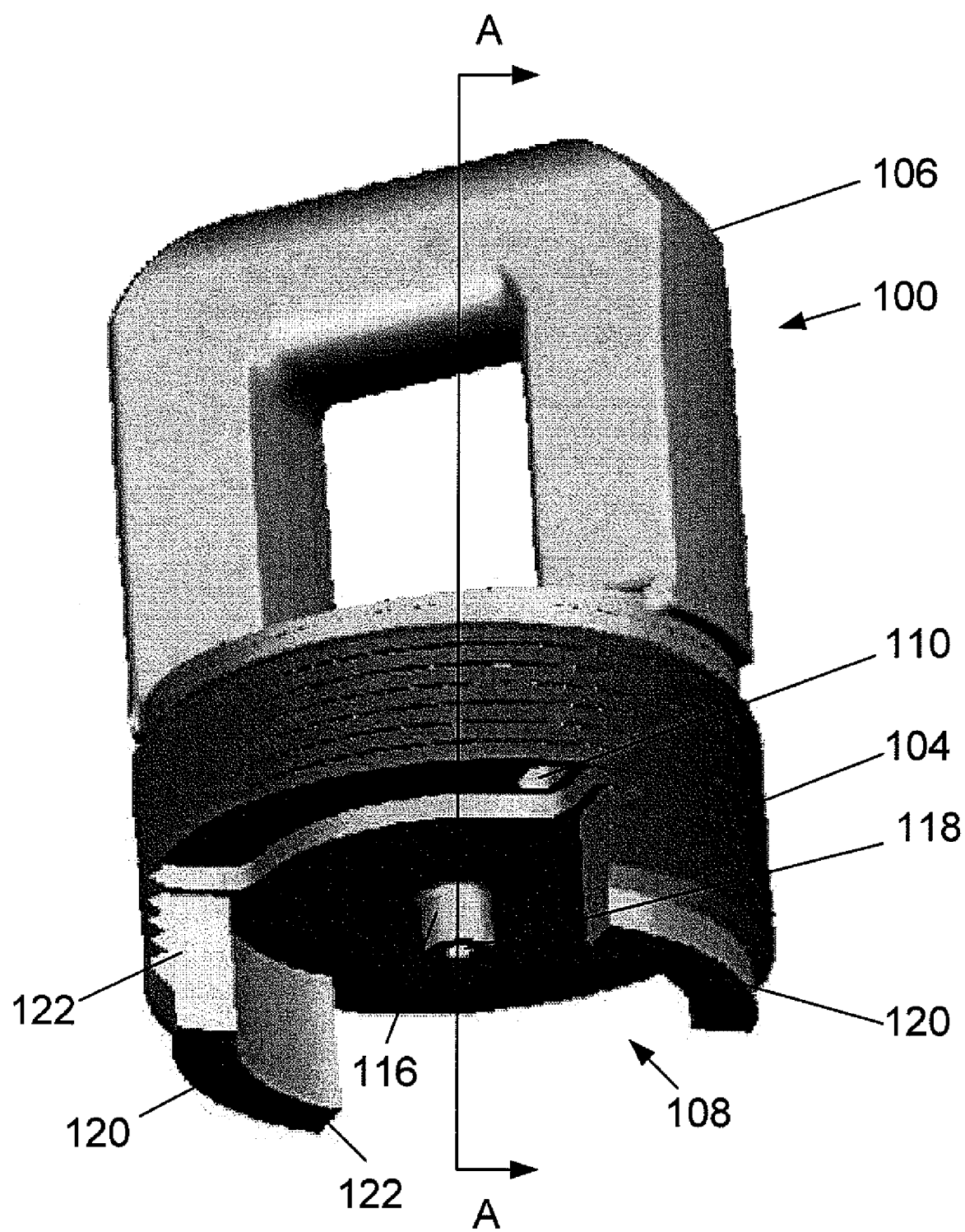
FIG. 5 and FIG. 6 show the modifications that are made to a standard suspension lug in order to convert it to the suspension lug of the invention.
Figure 6:
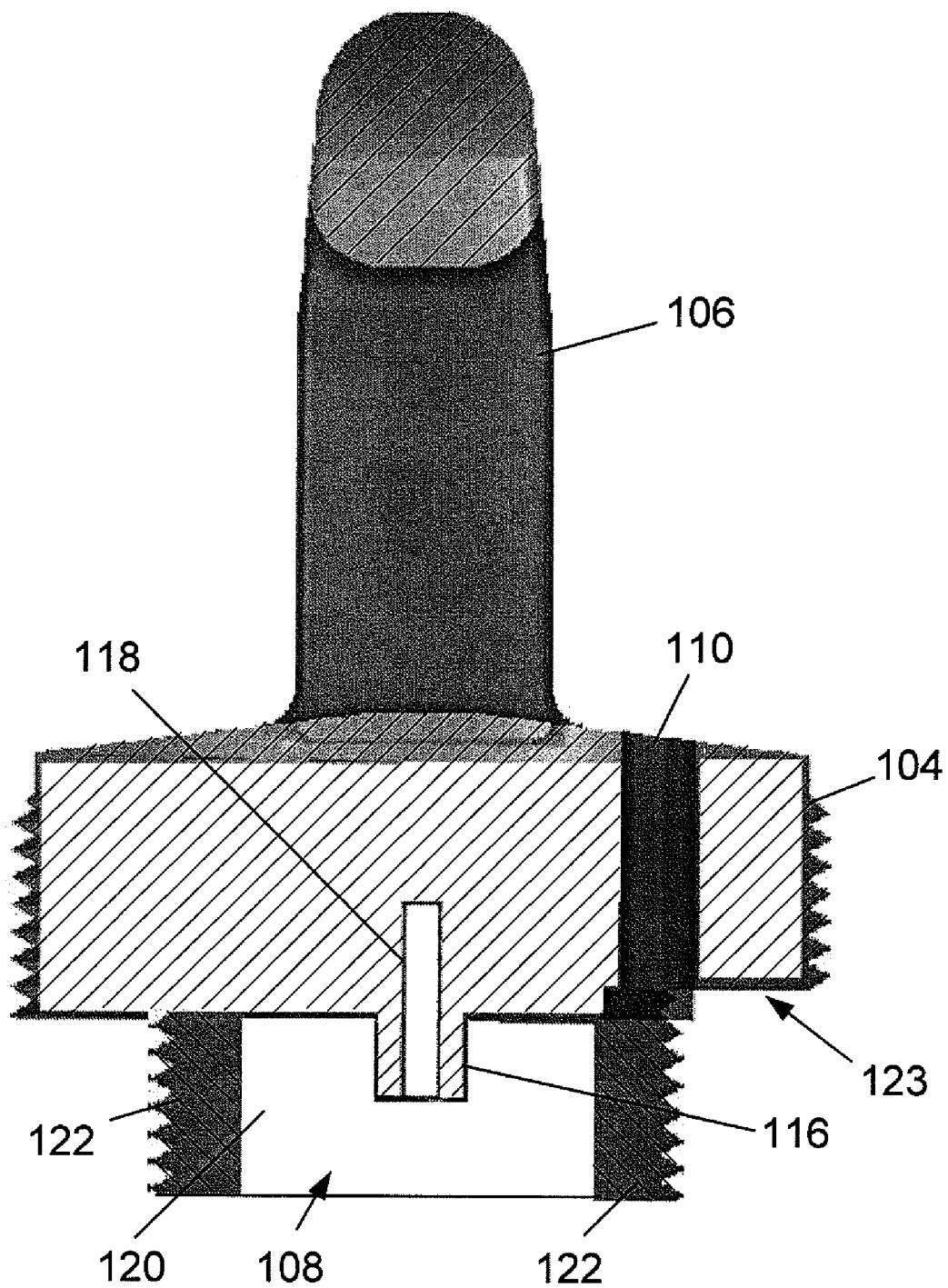

FIG. 5 and FIG. 6 show the modifications that are made to a standard suspension lug 12 (FIG. 4A) in order to convert it to the suspension lug 100 of the invention. Firstly the sloped surfaces 18 on the faces of the lug eye 16 are removed to create a lug eye 106 having a more slender side profile, for example as shown in FIG. 4B. Secondly, the lower section of the threaded base 104 is machined removing material from the interior to create a cylindrical post 116 surrounded by an annular hollow space 108. Thirdly two sections of the wall surrounding annular hollow space 108 are removed leaving two remaining wall sections 120 whose edges 122 are angularly spaced apart by ninety degrees to allow limited rotation of suspension lug 100, as will be explained herein below. Finally two holes, which are best seen in FIG. 6, which is a cross-sectional view of lug 100 along line A-A in FIG. 5, are machined in the upper solid section of threaded base 104. Well 118 comprises internal threads (not shown in the figures) into which the retaining screw 130 (see FIG. 10) of the rotation mechanism 102 can be threaded. Cylindrical channel 110 is drilled vertically through the upper part of threaded base 104 in order to allow access to the Allen screw 141 (see FIG. 7) that is used to lock the stopper 124 of the rotation mechanism as will be explained herein below. An approximately ninety degree section of the lower part of threaded base 104 is removed to create a clearance space 123 for the head of Allen screw 141 when lug 100 rotates relatively to the locked stopper 124. The modification process is divided into various steps above merely for convenience. Skilled persons will easily be able to determine the most efficient and cost effective manner to carry out the modifications of the standard lugs required by the invention.

Figure 8:
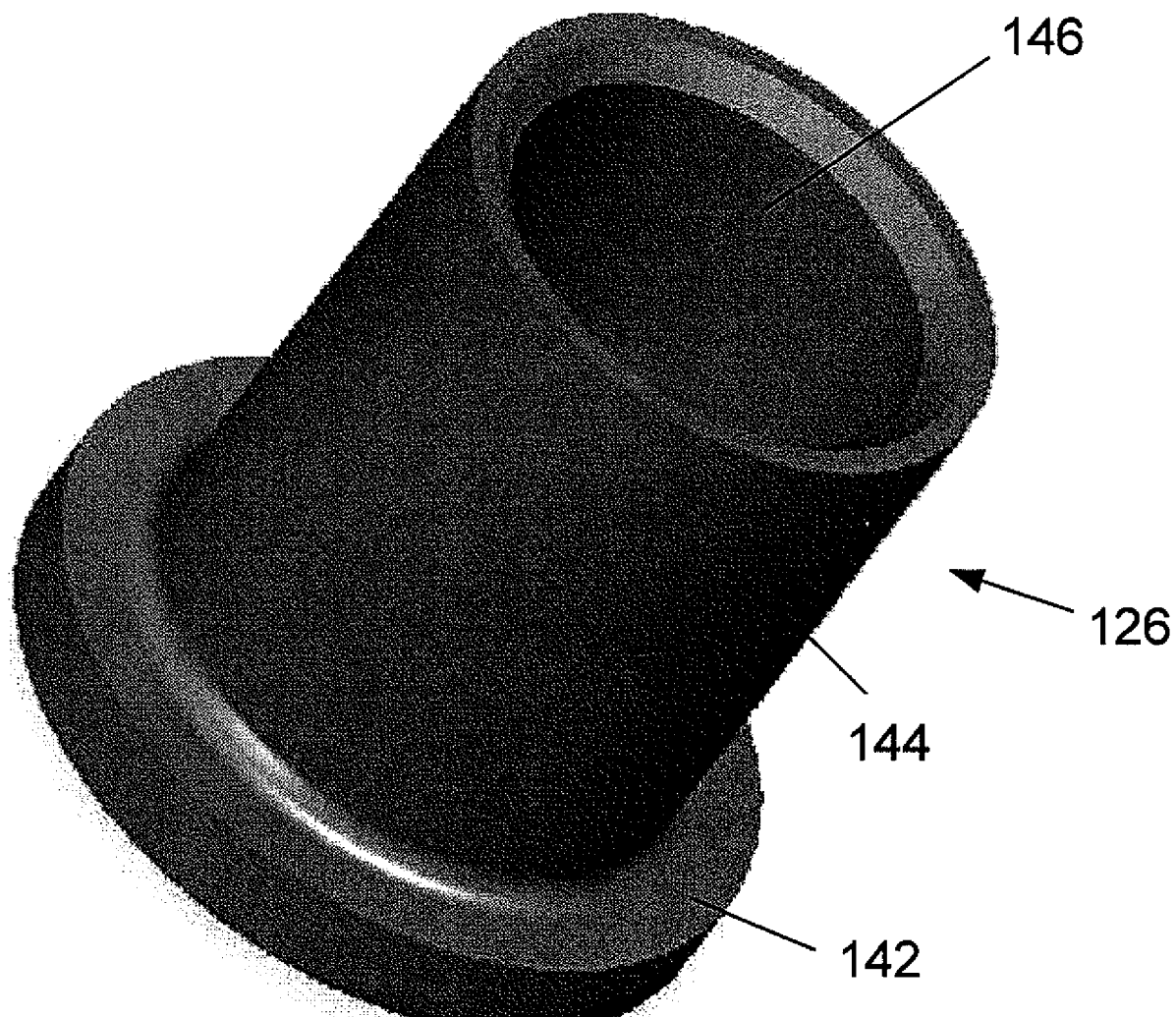
Figure 9:
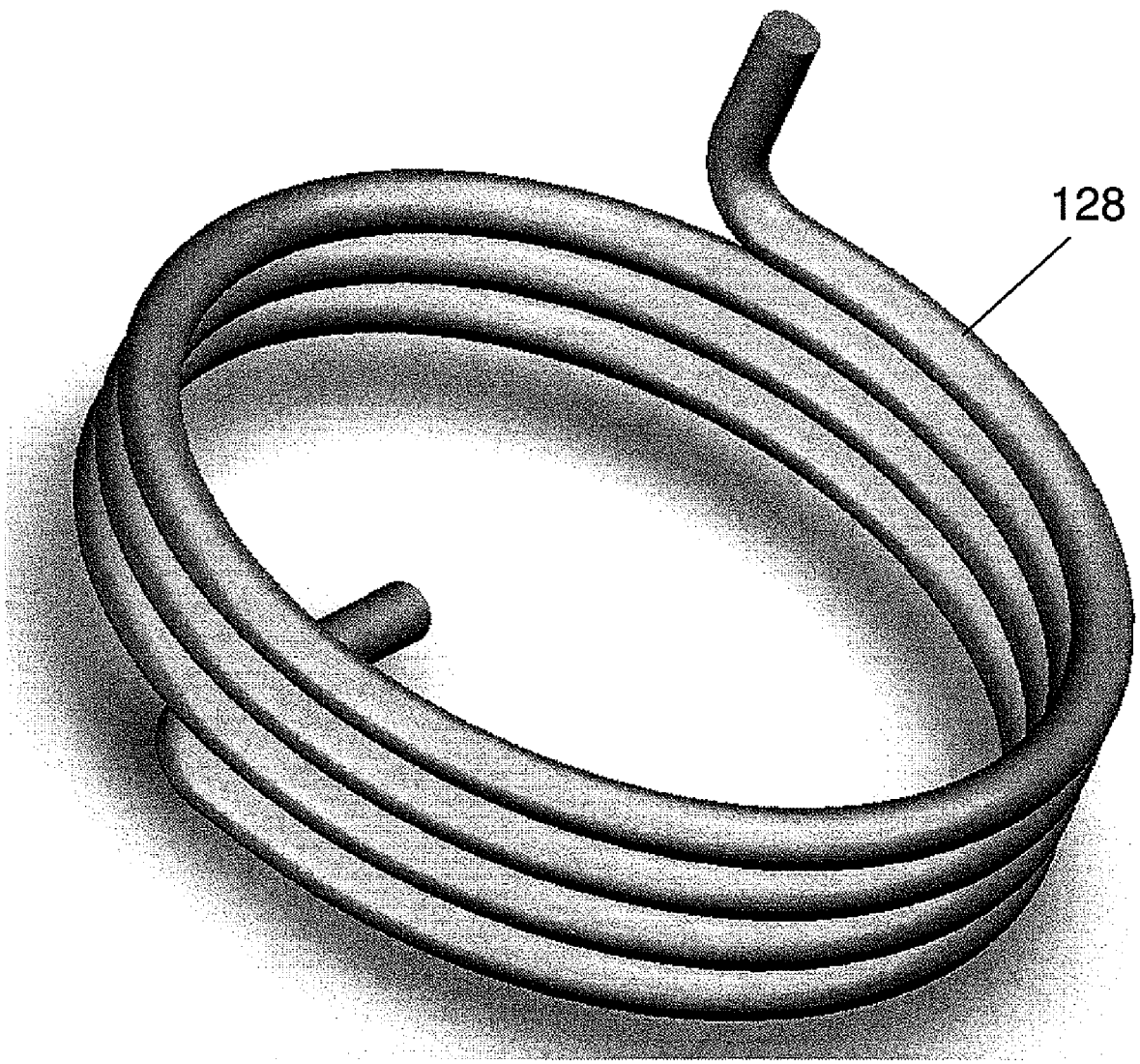
Figure 10:
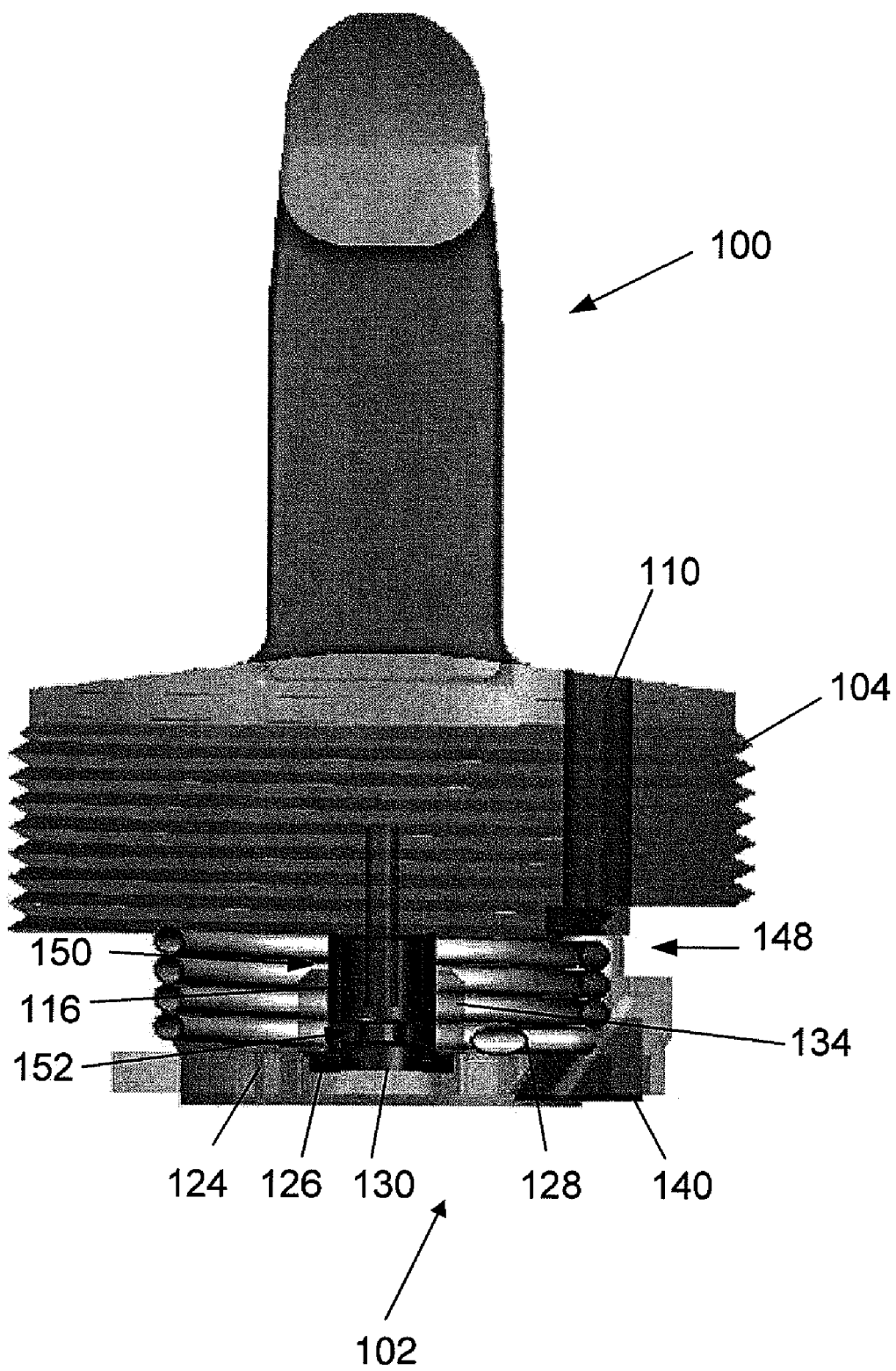
FIG. 10, FIG. 11, and FIG. 12 show the manner in which the major components of the rotation mechanism are assembled into the threaded base of the suspension lug of the invention.
Figure 11:
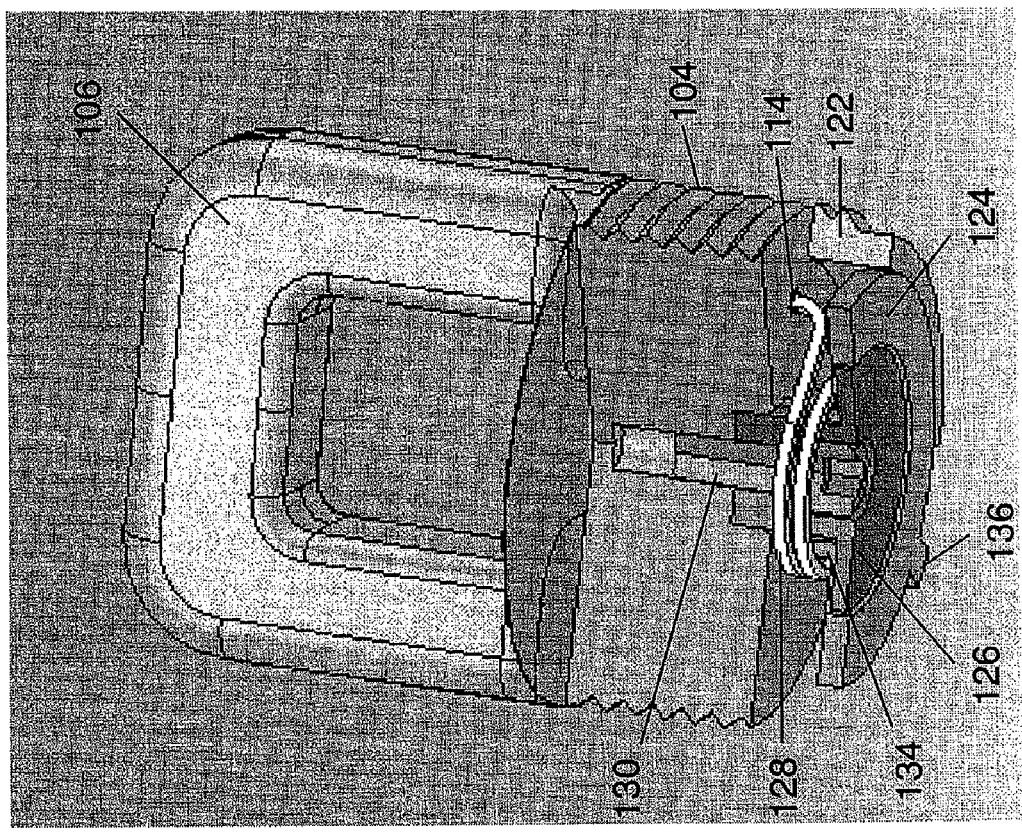
Figure 12:
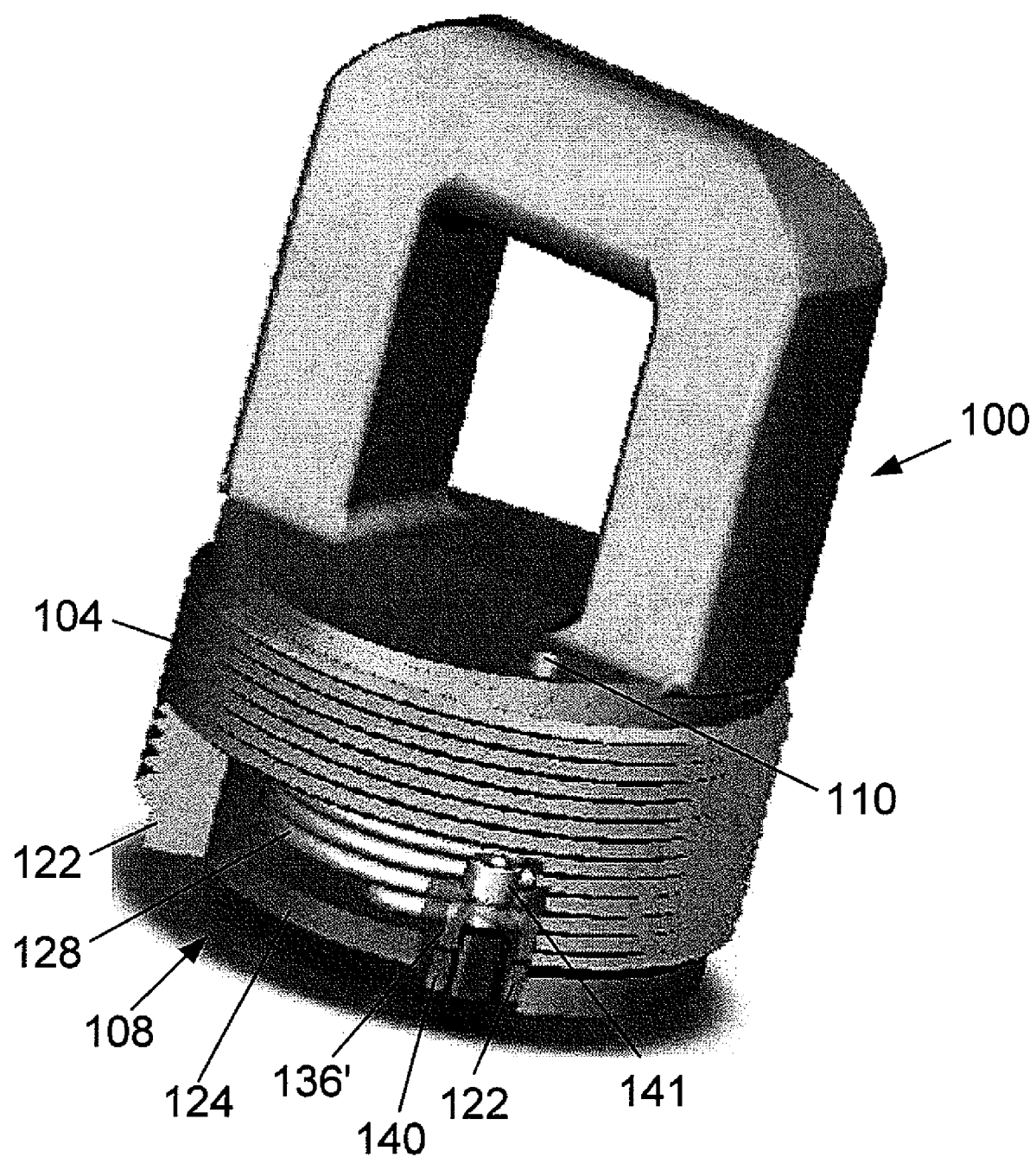

The major components of the rotation mechanism 102 (FIG. 3) are shown in FIG. 7A to FIG. 9 and the manner in which they are assembled into hollow space 108 created in the threaded base of the suspension lug of the invention is shown in FIG. 10 to FIG. 12.

Figure 7A:
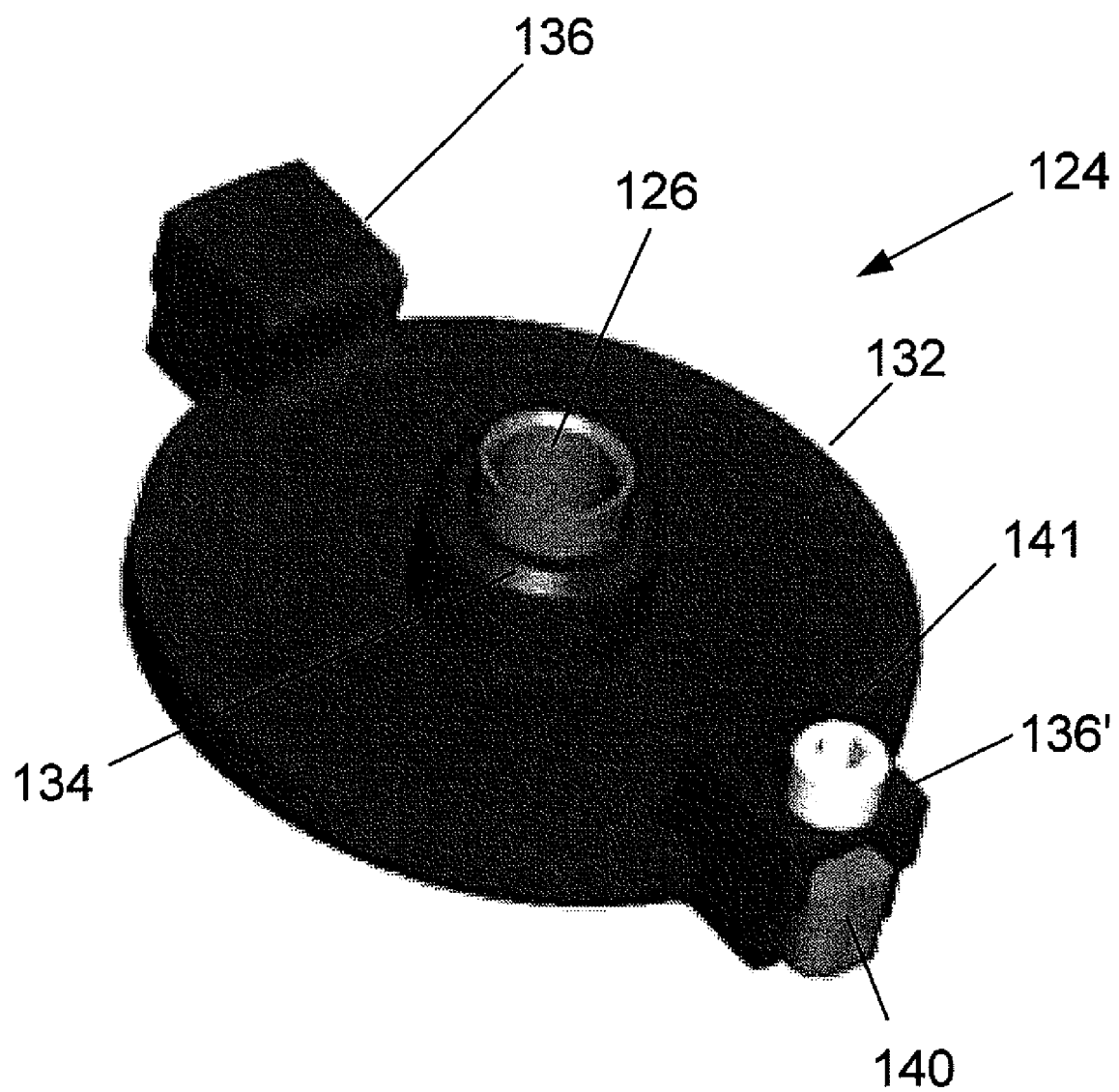
FIG. 7A, FIG. 7B, FIG. 8, and FIG. 9 show the major components of the rotation mechanism of the invention.

In FIG. 7A is shown the stopper 124, which is essentially a cylindrical disk 132 having a diameter that allows it to fit into and rotate freely within annular hollow space 108 in threaded base 104 of suspension lug 100. The center of the disk 132 has a hole bored through it, which is surrounded on the top side of the disk by an annular shaped wall 134. The inner diameter of annular wall 134 is determined to allow bushing 126 (FIG. 8) to slide through it. On each of the opposite ends of a diameter of the stopper is located a projection 136 and 136', that is part of the mechanism for locking the suspension lug in the correct starting orientation relative to the load. The diameter of stopper 124 measured at upper end of projections 136 and 136' equals that of the outer diameter of threaded base 104. Each projection 136, 136' fits into one of the sections of the wall of the threaded base 104 has been removed between wall sections 120. A vertical unthreaded hole, through which Allen screw 141 passes, is drilled through projection 136'.

Figure 7B:
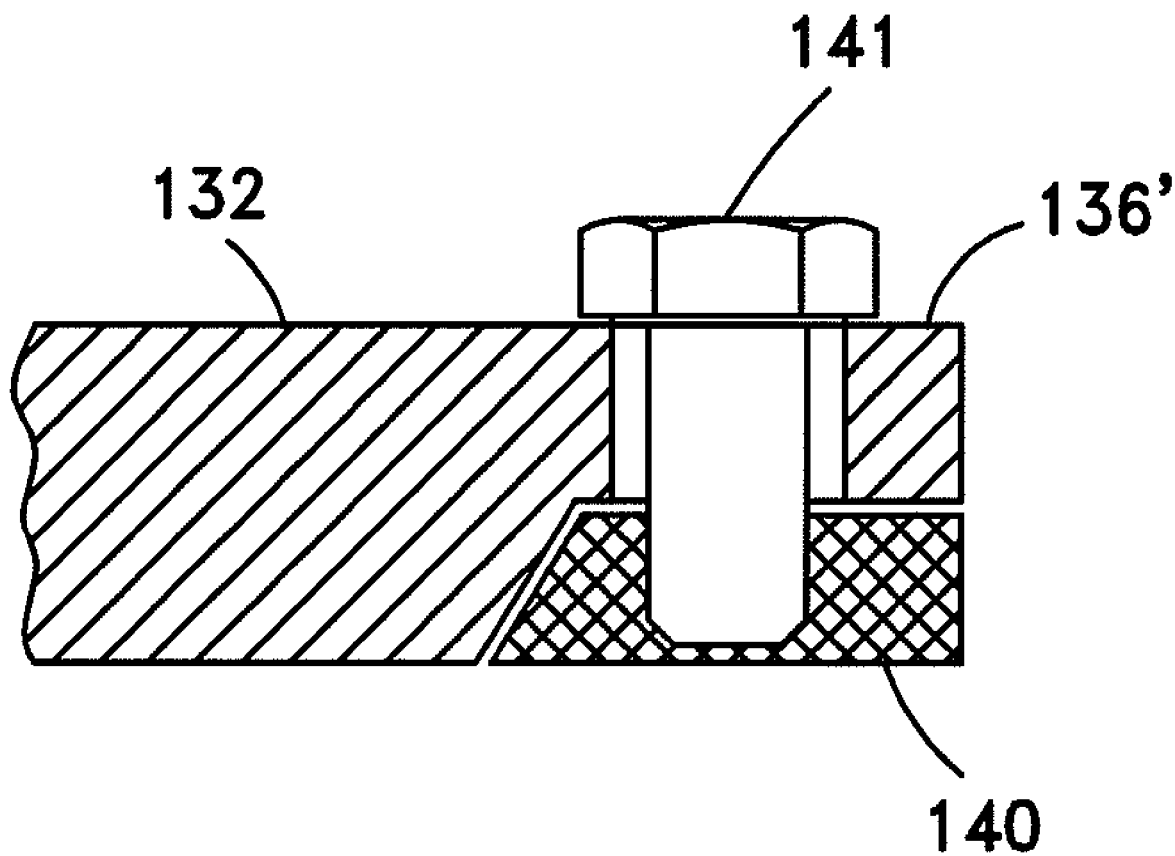

FIG. 7B is a magnified view of the area of projection 136' in FIG. 7A. As can be seen in FIG. 7B, a trapezoidal shaped section of the lower part of disc 132 and projection 136' is removed. Into this is inserted a matching trapezoidal shaped piece referred to herein as the brake 140. Brake 140 has a treaded hole in it into which Allen screw 141 can turn. Turning Allen screw 141 clockwise will cause brake 141 to move upwards. As brake 140 moves upwards relative to the bottom of disc 132, the sloped surfaces on disc 132 and brake 140 push against each other forcing brake 140 outwards, jamming it (and also projection 136) against the inside wall of the well in the load, thereby locking the stopper in place in the well of the load. Note that the hole drilled through projection 136' has a wider inside diameter than the diameter of Allen screw 141, thereby allowing the sidewards movement of brake 140. Skilled persons will realize that other locking mechanisms can be used to lock stopper 124 in place in the well and prevent rotation of the stopper relative to the load. For example, no brake of cut out portion of disc 132 need be provided and Allen screw 141 could be screwed in the threads of an appropriately located channel through projection 136' until it is firmly screwed against the bottom of the well. Similarly, screw 141 need not be an Allen screw, but can be any type of screw that can be turned from outside of the threaded base of the suspension lug through channel 110, for example by the use of a thin screw driver.

In FIG. 8 is shown bushing 126. The cylindrical annular upper part 144 of bushing 126 fits inside the annular wall 134 of stopper 124 and the hollow center 146 of bushing 126 slides over cylindrical post 116 (see FIG. 6, FIG. 7, and FIG. 10). The disk-like base 142 of bushing 126 fits into a cylindrical recess 148 in the bottom of stopper 124 (see FIG. 10). A retaining screw (130 shown in FIG. 10) is passed through the center of bushing 126 and threaded into well 118, thereby pushing the base of the bushing against the stopper 124 to hold the parts of the rotation mechanism 102 together in place.

In FIG. 9 is shown return spring 128. As will be described hereinbelow, return spring 128 supplies the force needed to cause suspension lug 100 to rotate ninety degrees when the load is released from the aircraft. Spring 128 fits around the outside of annular wall 134 of stopper 124. One end of return spring 128 is bent at a right angle forming a short tail that fits into a hole 114 (see FIG. 11) in threaded base 104. The other end of return spring 128 is straight and pushes against a projection (not shown) on the top of stopper 124. Thus, if force is applied to rotate the lug relative to the stopper in one direction, the spring is compressed. The energy stored in the spring can later be released to cause relative rotation in the opposite direction.

FIG. 10 is a cross-sectional view of suspension lug 100 with the components of rotation mechanism 102 installed. FIG. 11 shows suspension lug 100 with part of threaded base 104 removed to reveal some of the components of rotation mechanism 102. From FIG. 11 it can be seen how the return spring 128 fits around annular wall 134 on stopper 124 with its bent end inserted into hole 114 in threaded base 104. From FIG. 10 and FIG. 11, it can be seen how the retaining screw 130 passes through bushing 126, which in turn passes through stopper 124 thereby holding the return spring 128 in place. Screwing retaining screw 130 into the threaded well 118 in cylindrical post 116 holds the rotation mechanism 102 in position inside threaded base 104. Note that the dimensions of the components of rotation mechanism 102 are chosen to allow clearance spaces 150 and 152 between the top of annular wall 134 of stopper 124 and the top of annular hollow space 108 in threaded base 104 and between the head of retaining screw 130 and the top of cylindrical post 116 respectively. These clearance spaces, in addition to previously described recess 148 allow room for compression and expansion of spring 128 and free rotation of lug 100 relative to stopper 124.

The principle of operation of the invention can be understood by referring to FIG. 12. From FIG. 12 it can clearly be seen how the projection 136', with brake 140 attached to it by Allen screw 141, fits into the section of wall of threaded base 104 surrounding hollow space 108 that has been removed. This makes it possible to rotate suspension lug 100 relative to stopper 124, within the limits defined by edges 122. If, for example, stopper 124 is firmly anchored by means of brake 140 against the interior wall of the well of the load so that it can not move and suspension lug 100 is rotated clockwise as far as it can, i.e. until the side of projection 136' hits the left edge 122; then return spring 128 will be tightened. If the suspension lug is then released, the spring will unwind causing the suspension lug 104 to rotate relative to the fixed stopper 124 until the side of projection 136' hits right edge 122 preventing further rotation. According to the invention, the distances between right and left edges 122 are such that the range of rotation in either direction will be limited to exactly ninety degrees.

FIG. 13A to FIG. 13G schematically show the different stages in the installation and operation of the suspension lugs of the invention. In these figures, a section of the detachable load is represented by reference numeral 160, the direction of flight of the load once it is released from the airplane is from left to right in each figure, and the direction of rotation of suspension lug 100 when threaded into the well in the load is represented by the curved arrows.

Figure 13A:
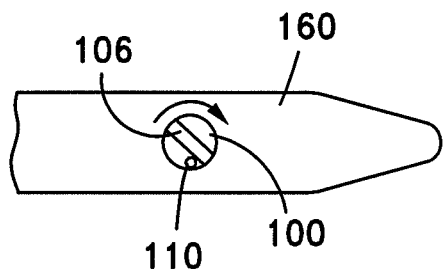
FIGS. 13A to FIG. 13G schematically show the different stages in the installation and operation of the suspension lugs of the invention.
Figure 13B:
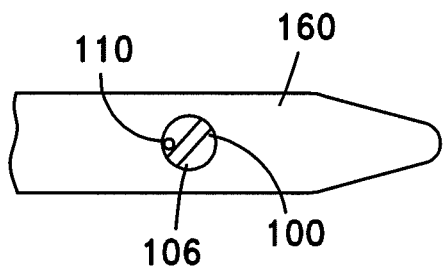
Figure 13C:
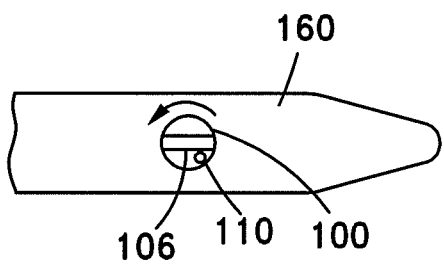

When it is required to attach the load to the aircraft the procedure followed by the ground crew is essentially the same as that followed in the prior art. The load and two suspension lugs 100 of the invention are brought from storage to a location close to the aircraft. If present, the protective cover of the well in the load is removed and suspension lug 100 is screwed into the well (FIG. 13A). Suspension lug 100 is screwed into the well as far as possible by hand without the use of tools. Since the threads of the well and those on the lug are not all created exactly the same, the rotation of the suspension lug 100 will be stopped at the bottom of the well with the lug oriented at some arbitrary angle with respect to the direction of flight (FIG. 13B). To properly orientate suspension lug 100, it is now rotated in the opposite direction (unscrewed) a partial turn until the edge of the lug eye 106 is pointed in the direction of flight 20 (FIG. 13C).

Figure 13D:
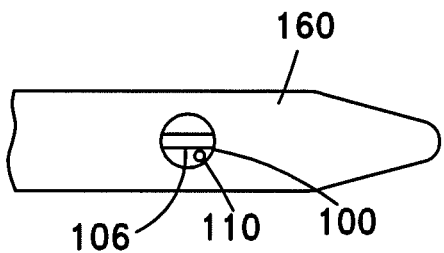

The stopper 124 of rotation mechanism 102 is now locked in place. Referring to FIG. 13D and FIG. 20, an Allen wrench is inserted into hole 110 and turned screwing Allen screw 141 into brake 140 causing the brake to jam against the threads on the inside of the well locking stopper 124 in place inside the well on the load.

Figure 13E:
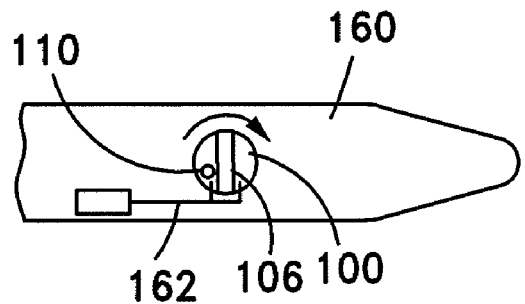
Figure 13F:
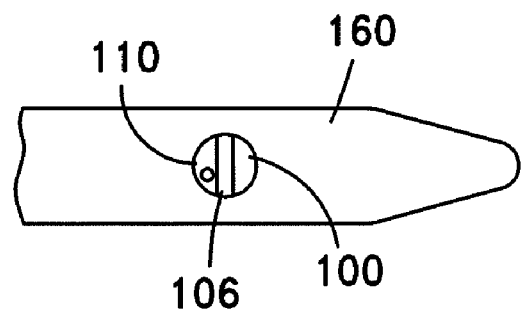
Figure 13G:
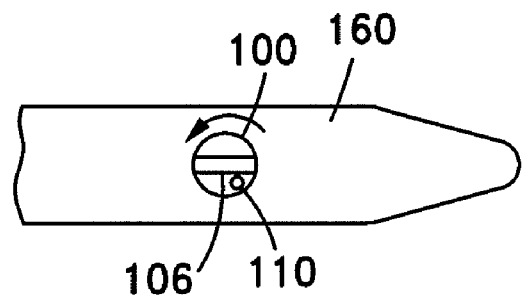

After stopper 124 has been locked by means of Allen screw 141 (FIG. 13D), a tool 162, for example a crescent or a pipe wrench, is used to rotate suspension lug 100 ninety degrees clockwise, as shown in FIG. 13E, from the orientation shown in FIG. 13D, so that the face of the lug eye 106 is pointed in the direction of flight 20. Since the stopper can not move, when suspension lug 100 is rotated the return spring 128 will be placed in tension.

Figure 1:
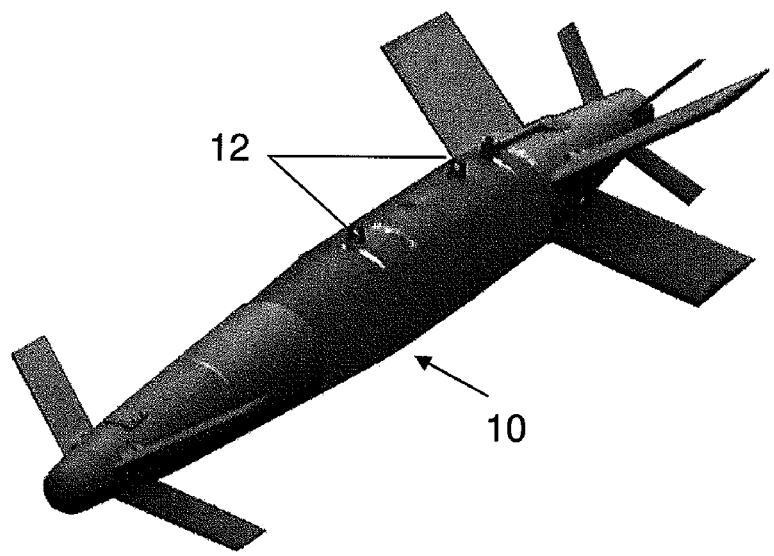
FIG. 1 shows a typical load with two prior art suspension lugs attached.

With the lug manually held in the position shown in FIG. 13E, the load is raised under the aircraft and the hook of the suspension apparatus on the aircraft (not shown) is slipped into lug eye 106 of suspension lug 100 of the invention (FIG. 13F) preventing lug 100 from rotating and keeping spring 128 in tension. The aircraft takes off and over the target hook 160 is slipped out of lug eye 106. As the load separates from the aircraft, the return spring 128 is free to return to its untensioned state and when doing so causes suspension lug 100 to rotate ninety degrees in a counter clockwise direction relative to the fixed stopper 124 and load, i.e. lug rotates to the orientation it had in FIG. 13D. In its downward flight towards the target, the narrow edge of the lug eye 106 of the suspension lug 100 is pointed in the direction of flight (FIG. 13G) thereby greatly reducing the drag on the load caused by the suspension lugs when compared to the orientation of the prior art suspension lugs (FIG. 1).

Theoretical calculations show that replacing standard suspension lugs with those of the invention will reduce the parasitic drag on the released load from 16% to 4%, which will increase the range of a gliding bomb by about 7% and a bomb propelled by a jet engine by about 10%.

Although embodiments of the invention have been described by way of illustration, it will be understood that the invention may be carried out with many variations, modifications, and adaptations, without exceeding the scope of the claims.

The invention claimed is:

1. A suspension lug for releasably suspending loads under aircraft, said suspension lug comprising:
    a lug eye and a threaded base;
    a rotation mechanism inserted into said threaded portion;
    wherein, when said suspension lug is threaded into a compatible well in said load and said load is released from said aircraft, said rotation mechanism causes said suspension lug to rotate by ninety degrees from an initial orientation in which a face of the lug eye is pointed in the direction of flight to a final orientation in which the face of the lug eye is pointed perpendicular to the direction of flight, thereby reducing the drag on said load.

2. A suspension lug according to claim 1, wherein the rotation mechanism comprises:
    a stopper comprising a locking mechanism;
    a bushing;
    a return spring; and
    a retaining screw.

3. A suspension lug according to claim 2, wherein the locking mechanism is a separate brake attached to the stopper by a screw that can be turned from outside of the threaded base of said suspension lug when said suspension lug is threaded into a well in the load.

4. A suspension lug according to claim 3, wherein, when said suspension lug is threaded into a well in the load, tightening the screw forces the brake radially outwards jamming it against an interior wall of said well and thereby locking the stopper preventing it from rotating relative to the load.

5. A suspension lug according to claim 4, wherein, when the stopper is locked, the return spring of the rotation mechanism allows said suspension lug to rotate relative to the load.

6. A suspension lug according to claim 5, wherein the threaded base of said suspension lug has been modified to allow said suspension lug to be rotated clockwise or counterclockwise within a maximum range of ninety degrees.

7. A method of modifying a suspension lug according to claim 1, said method comprising:
    removing a section of the bottom of the threaded base of said suspension lug to create a hollow space to accommodate the rotation mechanism; and
    removing at least a part of the face on each side of the lug eye of said suspension lug to create a more slender side profile of said lug eye.

8. A method of using one or more suspension lugs according to claim 2 for reversibly suspending a load comprising one or more compatible wells appropriately located on its top side from the bottom of an aircraft, said method comprising the steps of:
    bringing said load and said one or more suspension lugs from storage to a location close to said aircraft;
    screwing said one or more suspension lugs into said one or more wells as far as possible by hand without the use of tools;
    unscrewing each of said one or more suspension lugs a partial turn until the edge of the lug eye of each of said suspension lugs is pointed in the direction of flight;
    inserting a tool through a channel bored through the threaded base of each of said suspension lugs and tightening the screw of the locking mechanism, thereby preventing rotation of the stopper of the rotation mechanism of said suspension lug relative to said load;
    rotating, using a hand held tool, each of said suspension lugs ninety degrees clockwise so that the face of the lug eye of each of said suspension lugs is pointed in the direction of flight, thereby tensioning the spring of the rotation mechanism of each of said suspension lugs;
    holding, using said hand held tool, each of said suspension lugs so that the face of the lug eye of each of said suspension lugs is pointed in the direction of flight while raising the load towards the underside of said aircraft and slipping a hook of the suspension apparatus of said aircraft through said lug eye of each of said suspension lugs, thereby suspending said load from the bottom of said aircraft; and
    slipping said hooks out of said lug eye of each of said suspension lugs, thereby allowing said springs in said rotation mechanisms to return to their untensioned state and causing said suspension lugs to rotate until the edge of said lug eye of each of said suspension lugs is pointed in the direction of flight.

* * * * *